United States Patent [19]

Takagi

[11] Patent Number: 4,602,879

[45] Date of Patent: Jul. 29, 1986

[54] MULTICOLOR PRINTER USING MAGNETIC AND POSITIVE AND NEGATIVE ELECTROSTATIC CHARGING

[75] Inventor: Kazuhiko Takagi, Nagoya, Japan

[73] Assignee: Brother Industries, Ltd., Nagoya, Japan

[21] Appl. No.: 740,223

[22] Filed: Jun. 3, 1985

[30] Foreign Application Priority Data

Jun. 6, 1984 [JP] Japan ............................... 59-117259

[51] Int. Cl.⁴ ......................... B41J 3/02; G01D 15/06

[52] U.S. Cl. .................................... 400/119; 101/171; 101/426; 101/DIG. 13; 346/153.1; 346/157; 346/74.7; 430/35; 430/39; 430/42

[58] Field of Search ................ 400/119; 101/211, 171, 101/426, DIG. 13; 346/153.1, 157, 74.7; 358/300-301; 430/31, 35, 39, 42, 102, 123, 253, 301

[56] References Cited

U.S. PATENT DOCUMENTS

| | | | |
|---|---|---|---|
| 3,392,667 | 7/1968 | Cassel et al. | 346/157 X |
| 3,662,395 | 5/1972 | Doi et al. | 346/153.1 |
| 3,824,601 | 7/1974 | Garland et al. | 346/74.7 X |
| 3,987,491 | 10/1976 | Nelson | 346/157 |
| 4,148,043 | 4/1979 | Yamauchi et al. | 346/157 |
| 4,396,927 | 8/1983 | Amaya et al. | 346/153.1 |
| 4,399,749 | 8/1983 | Arai | 101/211 |
| 4,494,865 | 1/1985 | Andrus et al. | 358/300 |

FOREIGN PATENT DOCUMENTS

| | | | |
|---|---|---|---|
| 67275 | 5/1980 | Japan | 358/300 |
| 135872 | 10/1981 | Japan | 346/153.1 |
| 69063 | 4/1982 | Japan | 400/119 |
| 54574 | 3/1984 | Japan | 400/119 |

*Primary Examiner*—E. H. Eickholt

*Attorney, Agent, or Firm*—Kane, Dalsimer, Kane, Sullivan and Kurucz

[57] ABSTRACT

A multicolor printer for providing a printout of record data in desired colors by using the three primary colors of cyan, yellow and magenta either singly or by subtractive color mixing for developing a magnetic latent image and/or at least one type of electrostatic latent image formed on a recording drum having a conductive material layer, a magnetizable material layer and an insulating material layer superposed one over another in the indicated order. A multiple magnetic head forms on the magnetizable material layer a magnetic latent image of the record data corresponding to a first primary color, and a multiple stylus forms on the insulating material layer a positively charged electrostatic latent image and/or a negatively charged electrostatic latent image corresponding to a second primary color and/or a third primary color. The magnetic latent image and/or the electrostatic latent image or images are developed in the desired colors by a plurality of developing devices into a developed image of the record data which is printed on a sheet of support material by a transfer-printing roll and the multicolored image printed on the sheet of support material is fixed by fixing roll to provide a printout of the record data in multicolor.

8 Claims, 4 Drawing Figures

MULTICOLOR PRINTER USING MAGNETIC AND POSITIVE AND NEGATIVE ELECTROSTATIC CHARGING

BACKGROUND OF THE INVENTION

1. Field of the Invention

This invention relates to printers, and in particular it is concerned with a multicolor printer suitable for use in printing record data in colors conforming to color designating data.

2. Description of the Prior Art

Printers of an electrographic printing system and a thermographic printing system are known in the art for printing record data in colors conforming to color designating data by using the primary colors of cyan, yellow and magenta either singly or by subtractive color mixing. Of these two types of multicolor printers, the printer of the electrographic printing system has a multiplicity of electrodes spaced apart from each other by a spacing interval conforming to a predetermined resolution and selectively actuated to discharge in accordance with the record data of each one of the three primary colors so as to charge an insulating material layer of a conductive member to form an electrostatic latent image thereon. A toner of one color is electrostatically caused to adhere to the electrostatic latent image thus formed to develop the same into a toner image which is then printed by transferprinting on a sheet of support material. This process is repeated three times to effect subtractive color mixing of the toners of three different colors, so as to print the record data in multicolor in accordance with color designating data by using the three primary colors either singly or by subtractive color mixing. In the multicolor printer of the thermographic printing system, a thermal head is driven based on record data for each one of the three primary colors to successively effect thermal-transfer of an ink of each one of the three primary colors to a sheet of support material. As the thermal transfer of the inks of the three primary colors has been effected, record data is printed in multicolor in accordance with color designating data by using the three primary colors either singly or by subtractive color mixing.

Some disadvantages are associated with the multicolor printers of the aforesaid constructions of the prior art. In the multicolor printer of the electrographic printing system, it is necessary that the electrostatic latent image forming step and electrostatic latent image developing step be performed three times for each of the three primary colors. This has prolonged the period of time required for performing a multicolor printing operation and rendered the construction of the printer complex. In the multicolor printer of the thermographic printing system, it is also necessary that the thermal transfer-printing step be performed three times for each of the three primary colors. This not only prolongs the period of time required for performing a printing operation but also makes it necessary to feed a sheet of support material for each one of the three primary colors to print record data in multicolor. The sheet of support material shows changes in properties depending on the manner in which it is fed and the manner in which inks are thermally transferred thereto. Thus, great difficulties are experienced in positively performing subtractive color mixing of the three primary colors of cyan, yellow and magenta in conformity with a predetermined resolution. As a result, printouts of record data are generally low in quality due to mismatching of the three primary colors.

SUMMARY OF THE INVENTION

1. Object of the Invention

This invention has been developed for the purpose of obviating the aforesaid disadvantages of the prior art. Accordingly, the invention has as its object the provision of a multicolor printer capable of producing printouts of record data in multicolor in a short period of time in conformity with color designating data by using the three primary colors of cyan, yellow and magenta either singly or by subtractive color mixing and by forming a magnetic latent image and at least one type of electrostatic latent image with a simple construction while a recording drum makes one complete revolution.

2. Statement of the Invention

According to the invention, there is provided a multicolor printer capable of printing record data by using the three primary colors of cyan, yellow and magenta either singly or by subtractive color mixing, comprising a recording drum supported for rotation about its axis, said recording drum having on its outer peripheral surface a conductive material layer, a magnetizable material layer and an insulating material layer superposed one over the other in the indicated order, magnetic recording means located in a spaced, juxtaposed relation to the outer peripheral surface of the recording drum, said magnetic recording means including a multiplicity of recording elements located axially and spaced apart from each other by a predetermined spacing interval to form on the magnetizable material layer of the recording drum a magnetic latent image of record data corresponding to a first primary color constituting color designating data as the recording drum rotates, electrostatic recording means located in a spaced juxtaposed relation to the outer peripheral surface of the recording drum, said electrostatic recording means including a multiplicity of recording elements located in positions corresponding to those of the magnetic recording elements to form on the insulating material layer of the recording drum a positive electrostatic latent image and/or a negative electrostatic latent image based on record data corresponding to a second primary color and/or a third primary color constituting the color designating data as the recording drum rotates, developing means for developing the magnetic latent image and/or the electrostatic latent image or images formed on the recording drum in desired colors conforming to the color designating data to produce a multicolored image conforming to the record data, and transfer-printing means for printing on a sheet of support material by transferring the multicolored image conforming to the record data from the recording drum to the sheet of support material to provide a multicolored printout of the record data. The magnetic recording means and the electrostatic recording means are disposed in the rotating direction of the recording drum in order of said two means because the magnetic latent image is more stable than the electrostatic latent image. For the same reason, the electrostatic developing means is disposed in front than the magnetic developing means.

In the multicolor printer according to the invention, the magnetic recording means is actuated based on the record data of the first primary color constituting the color designating data to form a magnetic latent image of the record data on the magnetizable material layer of the recording drum, and the electrostatic recording means is actuated based on the record data of the second primary color and/or the third primary color to form at least one type of electrostatic latent image on the insulating material layer of the recording drum in positions corresponding to the magnetic latent image on the magnetizable material layer of the recording drum. The magnetic latent image and/or the electrostatic latent image or images are successively developed in the respective colors to produce a multicolored image conforming to the record data which is transferred from the recording drum to a sheet of support material by transfer-printing, so that the record data can be printed in the desired colors in conformity with the color designating data by using the three primary colors of cyan, yellow and magenta either singly or by subtractive color mixing. All the process steps described hereinabove are performed continuously as the recording drum makes one complete revolution.

The invention provides a multicolor printer capable of printing record data in multicolor in conformity with color designating data to produce a print-out of the record data in desired colors of high quality by a simple construction in a short period of time without any trouble.

DESCRIPTION OF THE PREFERRED EMBODIMENT

A preferred embodiment of the multicolor printer in accordance with the invention will be described by referring to the accompanying drawings.

Figure 1:
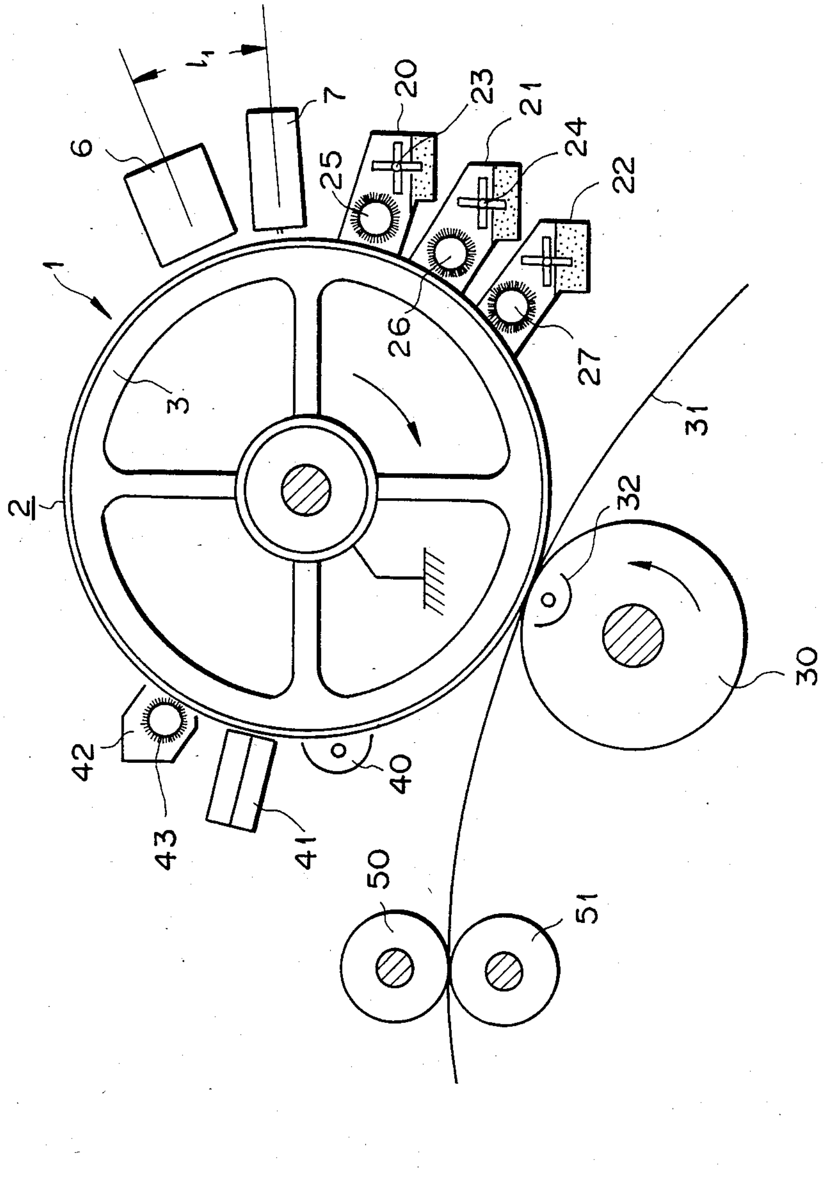
FIG. 1 is a schematic view of the multicolor printer comprising one embodiment of the invention.

Referring to FIG. 1, the multicolor printer generally designated by the reference numeral 1 comprises a recording drum 2 supported for rotation about its axis by a frame, not shown, of the printer. A step motor, not shown, is drivingly connected to the recording drum 2 which has on its outer peripheral surface, as shown in FIG. 2, a conductive material layer 3 formed of aluminum, a magnetizable material layer 4 superposed on the conductive material layer 3, and an insulating material layer 5 superposed on the magnetizable material layer 4 and capable of being electrically charged.

Figure 2:
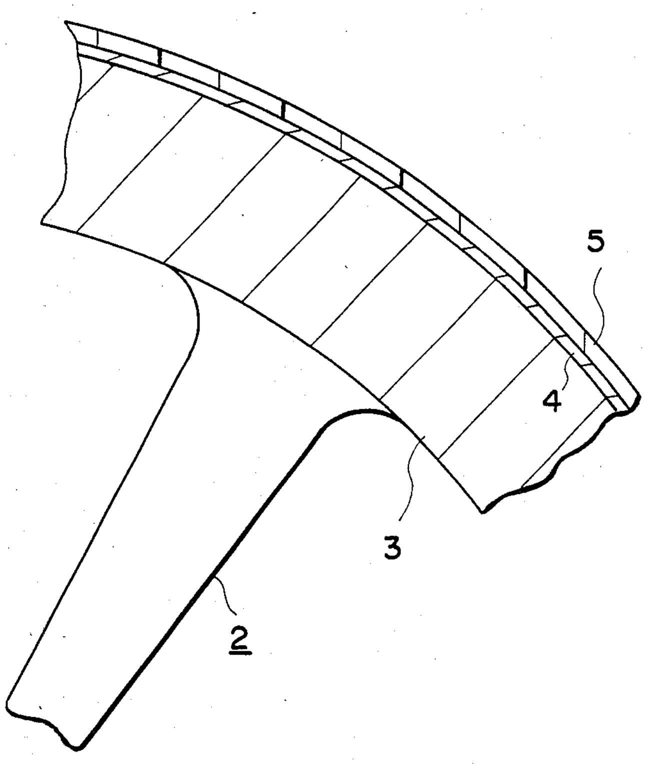
FIG. 2 is a fragmentary sectional view of the recording drum, showing its construction.

The magnetizable material layer 4 may be disposed between the conductive material layer 3 and the insulating material layer 5 as shown in FIG. 2 but other configurations are also possible. A multiple magnetic head 6 is located in a spaced juxtaposed relation to the outer peripheral surface of the recording drum 2 and supported by the frame in a position in which the recording drum 2 commences a printing operation operator. The multiple magnetic head 6 includes a multiplicity of magnetic heads, not shown, located axially of the recording drum 2 and spaced apart from each other by a spacing interval corresponding to a predetermined resolution and selectively actuated based on the print data of one primary color, such as cyan, for example, which constitutes color designating data, to magnetize the magnetizable material layer 4. As a result, a magnetic latent image of the print data of cyan is formed on the magnetizable material layer 4.

Figure 3:
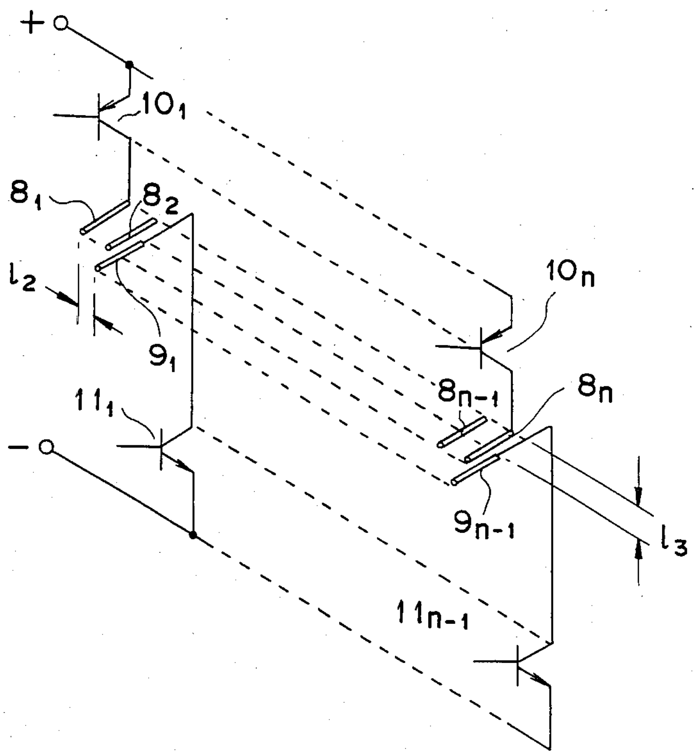
FIG. 3 is a partial schematic perspective view of the multiple stylus.

A multiple stylus 7 is located in a spaced juxtaposed relation to.the outer peripheral surface of the recording drum 2 in a position spaced apart from the multiple magnetic head 6 in the direction of rotation of the recording drum 2 a distance $l_1$ and supported by the frame. The multiple stylus includes a multiplicity of positively charging electrodes $\mathbf{8}_1$ to $\mathbf{8}_n$ and negatively charging electrodes $\mathbf{9}_1$ to $\mathbf{9}_{n-1}$ located parallel to each other axially of the recording drum 2 in a stagered relation, as shown in FIG. 3, with the electrodes $\mathbf{8}_1$ to $\mathbf{8}_n$ and $\mathbf{9}_1$ to $\mathbf{9}_{n-1}$ being spaced apart from each other a distance $l_2$ corresponding to the predetermined resolution axially of the recording drum 2 and the rows of electrodes $\mathbf{8}_1$ to $\mathbf{8}_n$ and $\mathbf{9}_1$ to $\mathbf{9}_{n-1}$ being spaced apart from each other a distance $l_3$ corresponding to the predetermined resolution in the direction of the rotation of the recording drum 2. The positively charging electrodes $\mathbf{8}_1$ to $\mathbf{8}_n$ are each connected to a collector of one of the positively charging on-off elements $\mathbf{10}_1$ to $\mathbf{10}_n$, each having an emitter connected to a positive power source, and the negatively charging electrodes $\mathbf{9}_1$ tp $\mathbf{9}_{n-1}$ are each connected to a collector of one of the negatively charging on-off elements $\mathbf{11}_1$ to $\mathbf{11}_{n-1}$, each having an emitter connected to a negative power source. The positively charging electrodes $\mathbf{8}_1$ to $\mathbf{8}_n$ are actuated to discharge in accordance with print data of another primary color such as yellow, for example, with a time lag corresponding to the distance $l_1$ behind the actuation of the multiple magnetic head 6. The negatively charging electrodes $\mathbf{9}_1$ to $\mathbf{9}_{n-1}$ are actuated to discharge based on print data of still another primary color or magenta, for example, with a time lag corresponding to the distance $l_3$ behind the actuation of the positively charging electrodes $\mathbf{8}_1$ to $\mathbf{8}_n$. As a result, two types of electrostatic latent image, one type being positively charged and the other type being negatively charged to represent the print data of yellow and magenta respectively are formed axially of the recording drum 2 and form a matrix with the magnetic latent image.

First to third toner supply devices 20 to 22 are located in face-to-face relation to the outer peripheral surface of the recording drum 2 in a position suitably spaced apart from the multiple stylus 7 in the direction of rotation of the recording drum 2 and supported by the frame. The first toner supply device 20, second toner supply device 21 and third toner supply device 22 contain a negatively charged toner of yellow color, a positively charged toner of magenta color and a toner of cyan color, respectively. The first toner device 20 and second toner device 21 comprise agitating means 23 and 24, respectively, for agitating the respective color toners to charge them negatively and positively, respectively, as described hereinabove. The color toners in the first, second and third toner supply devices 20 to 22 are supplied to the outer peripheral surface of the recording drum 2 by magnetic brushes 25 to 27, respectively, in a suitable amount. As a result, the color toner supplied from the first toner supply device 20 adheres to positively charged regions of the insulating material layer 5 and the color toner supplied from the second toner supply device 21 adheres to negatively charged regions of the insulating material layer 5, so as to develop the respective electrostatic latent images into toner images of yellow and magenta colors, respectively. The color toner supplied from the third toner supply device 22 adheres to magnetized regions of the magnetizable material layer 4, to develop the magnetic latent image into a toner image of cyan color.

A transfer-printing roll 30 is located in a position spaced apart from the third toner supply device 22 in the direction of rotation of the recording drum 2 a suitable distance and supported by the frame for rotation while being capable of coming into and out of pressing contact, at its outer peripheral surface, with the outer peripheral surface of the recording drum 2. The transfer-printing roll 30 which is driven for rotation at the same peripheral velocity as the recording drum 2 in synchronism therewith forces against the outer peripheral surface of the recording drum 2 a sheet of support material 31 which is fed in timed relation to the contacting of the printing commencing position on the outer peripheral surface of the recording drum 2 with the outer peripheral surface of the transfer-printing roll 30. Thus, the toner of cyan color magnetically adhering to the magnetizable material layer 4 and toners of yellow and magenta colors electrostatically adhering to the insulating material layer 5 are transferred to the sheet of support material 31 under pressure. A transfer-printing corona discharger 32 is mounted within the transfer-printing roll 30 and produced an electric field of high intensity between the outer peripheral surfaces of the recording drum 2 and transfer-printing roll 30 by corona discharge to cause the toners of cyan, yellow and magenta colors to adhere to the sheet of support material 31.

A charge removing device 40 and a demagnetizing device 41 disposed adjacent to each other and in face-to-face relation to the outer peripheral surface of the recording drum 2 are located in a position spaced apart a suitable distance from the transfer-printing roll 30 in the direction of rotation of the recording drum 2. The charge removing device 40 is operative to produce an alternating current electric field between it and the conductive material layer 3 of the recording drum 2 to remove from the insulating material layer 5 of the recording drum 2 the electric charge produced by the discharge of the transfer-printing corona discharger 32. The demagnetizing device 41 is operative to demagnetize the magnetizable material layer 4 magnetized by an alternating current magnetic field. A cleaning device 42 is disposed adjacent to the demagnetizing device 41 in a position posterior thereto with respect to the direction of rotation of the recording drum 2 and has a brush 43 for removing from the outer peripheral surface of the recording drum 2 residual toners and recovering same.

A fixing roll 50 having a built-in electric heater, not shown, is supported for rotation by the frame and located in pressing contact with a support roll 51. The sheet of support material 31 on which a multicolor toner image is supported passes through a nip between the fixing roll 50 and support roll 51 whereby the multicolored toner image on the sheet of support material 31 is fixed by heat and pressure.

Figure 4:
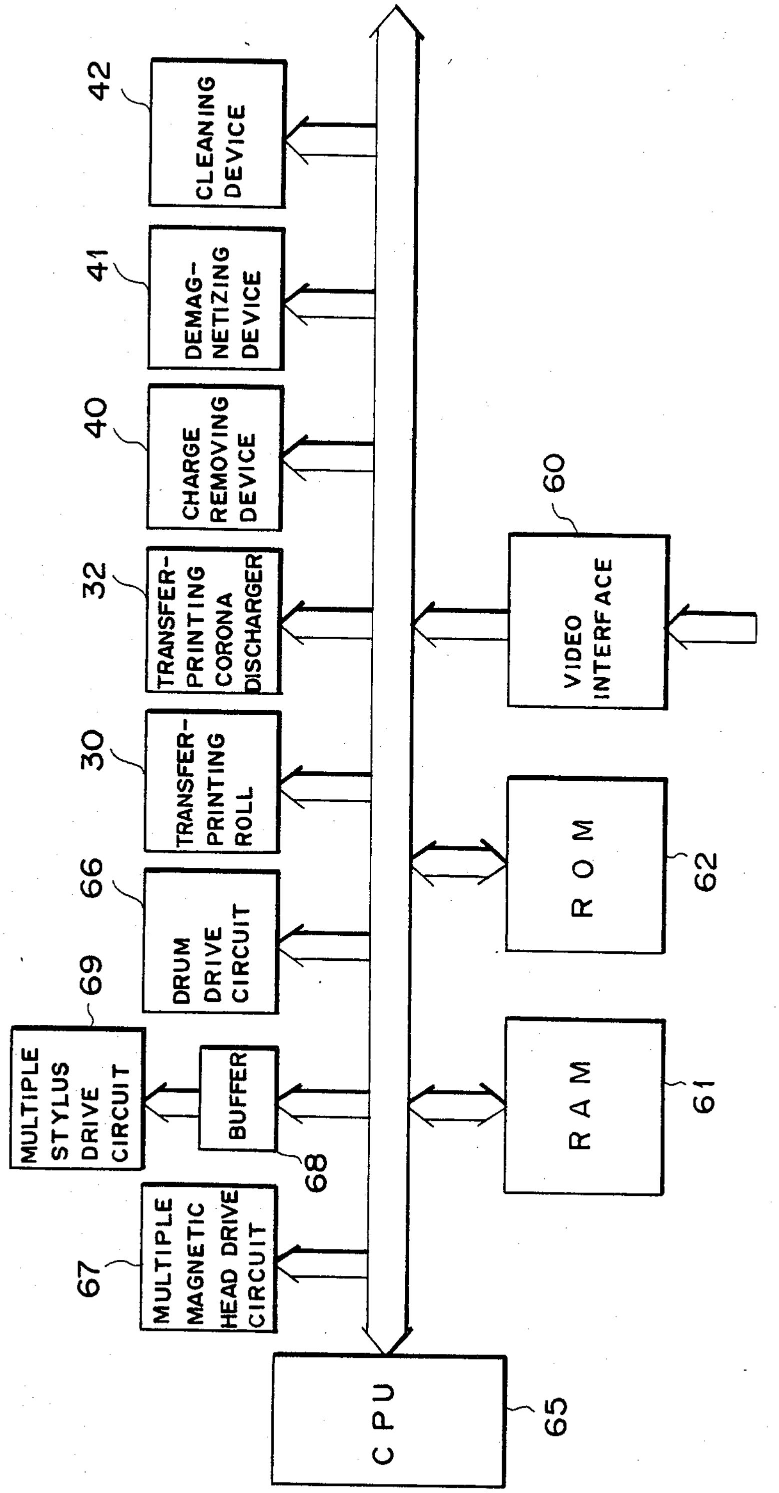
FIG. 4 is an electronic block diagram of the multicolor printer.

The multicolor printer according to the invention will be described in detail by referring to FIG. 4 which is a block diagram of electronic devices. Print data including color designating data for more than one color is inputted to a video interface 60 from an external device. The color designating data is constituted by the three primary colors of red, green and blue, and the video interface 60 converts the color designating data to color designating codes for the three primary colors of yellow, magenta and cyan. Print data of one page including the color designating codes to which the color designating data has been converted by the video interface 60 is stored in a random access memory (RAM) 61 which allows rewriting. A read-only memory (ROM) 62 stores dot pattern data of the print data. A central processing unit (CPU) 65 successively outputs drive pulses to a drum drive circuit 66 based on a printing commencing signal inputted from the external device, thereby driving the recording drum 2 to make one complete revolution. As the recording drum 2 rotates, the CPU 65 actuates the transfer-printing roll 30, transfer-printing corona discharger 32, charge removing device 40, demagnetizing device 41 and cleaning device 42. Based on print data for one line including the color designating codes retrieved from the RAM 61, the CPU 65 retrieves dot pattern data of the print data from the ROM 62. After separating dot data for one line of dots from the dot pattern data each time the drive pulse is outputted, the CPU 65 outputs the dot data to a multiple magnetic head drive circuit 67 and/or a multiple stylus drive circuit 69 via a buffer 68 depending on the color designating codes. The multiple magnetic head drive circuit 67 selectively actuates the magnetic heads based on the dot data of one primary color or cyan to magnetize the magnetizable layer 4 of the recording drum 2, to thereby form a magnetic latent image of the print data. The multiple stylus drive circuit 69 drives the positively charging electrodes $8_1$ to $8_n$ and/or negatively charging electrodes $9_1$ to $9_{n-1}$ to discharge, with a time lag corresponding to the distance $l_1$ behind the actuation of the multiple magnetic head 6 by the multiple head drive circuit 67 by means of the buffer 68. More specifically, the multiple stylus drive circuit 69 selectively actuates the positively charging electrodes $8_1$ to $8_n$ to discharge based on the dot data of another primary color or yellow to positively charge the surface of the insulating material layer 5 in a position corresponding to that of the magnetic latent image on the magnetizable material layer 4, and selectively actuates the negatively charging electrodes $9_1$ to $9_{n-1}$ based on the dot data of still another primary color or magenta with a time lag corresponding to the distance $l_3$ behind the actuation of the positively charging electrodes $8_1$ to $8_n$, to negatively charge the surface of the insulating material layer 5 in a position spaced apart a distance $l_2$ axially of the recording drum 2 from the position on the insulating layer 5 which has previously been positively charged. Thus, a magnetic latent image and two types of electrostatic latent images are produced in the form of a matrix conforming to a resolution.

A multicolor printing operation performed by the multicolor printer of the aforesaid construction will be described.

Upon one page of print data including color designating data for more than one color being inputted from an external device, the video interface 60 converts the color designating data constituted by the primary colors of red, green and blue to color designating codes for the primary colors of yellow, magenta and cyan and outputs one page of print data including the color designating codes to the CPU 65 which, after writing the one page of print data including the color designating codes to the RAM 61, retrives from the RAM 61 one line of print data including the color designating codes based on a printing commencing signal outputted from the external device at the time the one page of print data has been transferred therefrom. The CPU 65 also retrieves from the ROM 62 dot pattern data corresponding to the print data. At the same time, the CPU 65 successively outputs, based on the printing commencing signal, drive pulses to the drum drive circuit 66, so as to drive the recording drum 2 for rotation and actuate the transfer-printing roll 30, transfer-printing corona discharger 32, charge removing device 40, demagnetizing device 41 and cleaning device 42. After separating dot data for one line of dots from the retrieved dot pattern each time one drive pulse is outputted, the CPU 65 outputs the dot data to the multiple magnetic head drive circuit 67 and/or multiple stylus drive circuit 69 via the buffer 68. Thus, the multiple magnetic drive circuit 67 selectively actuates the magnetic heads to discharge based on the dot data for cyan color, to thereby magnetize the magnetizable material layer 4 to form a magnetic latent image thereon. The presence of the buffer 68 causes a time lag corresponding to the distance $l_1$ to occur in the actuation of the multiple stylus drive circuit 69 behind the actuation of the multiple magnetic head drive circuit 67, so that the multiple stylus drive circuit 69 actuates the positively charging electrodes $\mathbf{8}_1$ to $\mathbf{8}_n$ and/or negatively charging electrodes $\mathbf{9}_1$ to $\mathbf{9}_{n-1}$ to discharge based on the dot data with a timing such that the magnetic latent image formed by the multiple magnet 6 is positioned with the magnetic stylus 7. Thus, the surface of the insulating material layer 5 is positively and/or negatively charged in regions spaced apart from each other the distance $l_2$ in a position corresponding to that of the magnetic latent image on the magnetizable material layer 4, with the result that two types of electrostatic latent images, one type charged positively and the other type charged negatively, are formed as a matrix based on the dot data of yellow and/or magenta. By performing the process described hereinabove, the CPU 65 forms the magnetic latent image of cyan and the electrostatic latent images of yellow and/or magenta on the magnetizable material layer 4 and insulating material layer 5, respectively, based on the one page of print data written to the RAM 61, as the recording drum 2 rotates in the direction of an arrow shown in FIG. 1.

Further rotation of the recording drum 2 brings the electrostatic latent image based on the print data of yellow color to a position in which it is positioned against the first toner supply device 20 which feeds the toner of yellow color which is negatively charged to positively charged regions of the insulating material layer 5. Likewise, as the electrostatic latent image based on the print data of magenta color is brought to a position in which it is positioned against the second toner supply device 21, the toner of magenta color which is positively charged is fed to negatively charged regions of the insulating material layer 5. Thus, the respective color toners electrostatically adhere to oppositely charged regions of the insulating material layer 5. When the magnetic latent image based on the print data of cyan color is positioned against the third toner supply device 22, the toner of cyan color is fed from the third toner supply device 22 to magnetized regions of the magnetizable material layer 4 and magnetically adheres thereto. In this way, the electrostatic latent image or images and/or the magnetic latent image based on the print data for one page are developed by the toners of different colors by using the three primary colors of cyan, yellow and magenta either singly or by subtractive color mixing in the form of a matrix to provide a developed image of the print data in the form of a matrix.

When the rotation of the recording drum 2 brings the developed image of the print data to a position in which it is positioned against the transfer-printing roll 30, the transfer-printing roll 30 forces against the outer peripheral surface of the recording drum 2 the sheet of support material 31 which is fed to the nip between the recording drum 2 and transfer-printing roll 30 as the printing commencing position on the surface of the former is brought into contact with the latter. As a result, the developed image of the print data in the form of a matrix is printed on the sheet of support material 31 under pressure. At this time, an electric field of high intensity is produced between the transfer-printing roll 30 and the conductive material layer 3 of the drum 2 by the action of the transfer-printing corona discharger 32, the toners of different colors adhering to the outer peripheral surface of the recording drum 2 are attracted to the surface of the sheet of support material 31 by the electric field.

Thus, the developed image of the print data formed by using the three types of color toner of cyan, yellow and magenta either singly or by subtractive color mixing in the form of a matrix and printed on the sheet of support material 31 is fixed on the sheet of support material 31 by heat and under pressure as the sheet of support material 31 travels through its path between the fixing roll 50 provided with a heater and the support roll 51.

After the developed image of the print data has been transferred to the sheet of support material 31, the insulating material layer 5 of the recording drum 2 charged by the discharging action of the transfer-printing corona discharger 32 is electrically neutralized by an AC discharge effected by the charge removing device 40, so as to thereby remove the charge from the insulating material layer 5. As the rotation of the recording drum 2 brings the magnetic latent image formed on the magnetizable material layer 4 to a position in which it is positioned against the demagnetizing device 41, the latter demagnetizes the magnetizable material layer 4 by producing an AC magnetic field, to thereby erase the magnetic latent image. The cleaning device 42 clears the outer peripheral surface of the recording drum 2 of residual toner particles by means of a brush 43 which rotates.

When no print data including color designating data is transferred to the printer from the external device or the sheet of support material 31 is not supplied to the recording drum 2 after lapse of a predetermined time following the printing of the print data for one page in multicolor in conformity with the color designating codes as described hereinabove, the CPU 65 outputs a drive pulse to the drum drive circuit 56 to cause the recording drum 2 to make one revolution while actuating the charge removing device 40, demagnetizing device 41 and cleaning device 42 while the drum 2 is rotating, so as to thereby set the printer ready for another printing operation. Following the initial setting of the printer for the following printing operation, the CPU 65 stops the rotation of the recording drum 2 and deactuates the charge removing device 40, demagnetizing device 41 and cleaning device 42.

From the foregoing description, it will be appreciated that in the multicolor printer according to the invention, a magnetic latent image of print data for cyan is formed on the magnetizable material layer, and at least one of two types of electrostatic latent image, one type positively charged and the other type negatively charged, of print data for yellow color and/or magenta color is formed as a matrix on the insulating material layer. The magnetic latent image and/or the electrostatic latent image or images are developed with toners of the three primary colors of cyan, yellow and magenta which are used either singly or by subtractive color mixing in the form of a matrix, to provide a developed toner image of the print data in multicolor which is printed by transfer-printing on the sheet of support material, so as to print data in multicolor in conformity with the color designating data. All the printing process steps are performed during one complete revolution of the recording drum.

What is claimed is:

1. A multicolor printer capable of printing record data by using the three primary colors of cyan, yellow and magenta either singly or by subtractive color mixing, comprising:

a recording drum supported for rotation about its axis, said recording drum having on its surface a conductive material layer, an insulating material layer superposed over the conductive material layer and a magnetizable material portion;

magnetic recording means located in spaced juxtaposed relation to the outer peripheral surface of the recording drum to form on the magnetizable material layer of the recording drum a magnetic latent image of record data corresponding to a first primary color constituting color designating data as the recording drum rotates;

electrostatic recording means located in a spaced juxtaposed relation to the outer peripheral surface of the recording drum to form on the insulating material layer of the recording drum a positive electrostatic latent image and a negative electrostatic latent image based on record data corresponding to a second primary color and a third primary color respectively constituting the color designating data as the recording drum rotates;

developing means for developing the magnetic latent image and the electrostatic latent image on the recording drum in desired colors conforming to the color designating data to produce a multicolored image conforming to the record data; and transfer printing means for printing on a sheet of support material by transferring the multicolored image conforming to the record data from the recording drum to the sheet of support material to provide a multicolored printout of the record data.

2. A multicolor printer as claimed in claim 1 where said magnetic recording means includes a multiplicity of magnetic recording elements located axially of the recording drum and spaced apart from each other by a predetermined spacing interval; and said electrostatic recording means includes a multiplicity of electrostatic recording elements located in positions corresponding to those of the magnetic recording elements.

3. A multicolor printer as claimed in claim 2 where said electrostatic recording means is formed with two groups of multiple stylus including a multiplicity of positively charging electrodes and negatively charging electrodes located parallel to each other axially of the recording drum in a staggered relation.

4. A multicolor printer as claimed in claim 3, wherein said developing means includes the first, second and third toner supply devices containing a first color toner for magnetic latent image and second and third color toners for the electrostatic positive and negative latent images on the recording drum.

5. A multicolor printer as claimed in any one of the preceding claims wherein said transfer printing means includes a transfer printing corona discharger mounted within the transfer printing means for producing the electric field of high intensity between the outer peripheral surface of the recording means and the transfer printing means by corona discharge.

6. A multicolor printer as claimed in claim 1 wherein said magnetic recording means and said electrostatic recording means are disposed in the rotating direction of the recording drum in order of said two means.

7. A multicolor printer as claimed in claim 4 wherein said second color toner, third color toner and first color toner are disposed in the rotating direction of the recording drum in indicated order.

8. A multicolor printer as claimed in claim 1 wherein said magnetizable material portion forms a layer which is disposed between said conductive material layer and said insulating material layer.

* * * * *